United States Patent
Brita et al.

(10) Patent No.: US 11,319,424 B2
(45) Date of Patent: *May 3, 2022

(54) PLASTIC DEPOLYMERIZATION USING HALLOYSITE

(71) Applicant: Basell Poliolefine Italia S.r.l., Milan (IT)

(72) Inventors: Diego Brita, Ferrara (IT); Sheri E. Davis, Baytown, TX (US); Volker Fraaije, Frankfurt am Main (DE); Simona Guidotti, Ferrara (IT); Dario Liguori, Ferrara (IT); Sandor Nagy, Seabrook, TX (US); David L. Ramage, Friendswood, TX (US); Shahram Mihan, Bad Soden (DE); Christopher D. Smith, Kingwood, TX (US); Daniel F. White, Houston, TX (US); Xueyong Yang, Bellaire, TX (US)

(73) Assignee: Basell Poliolefine Italia S.r.l., Milan (IT)

(*) Notice: Subject to any disclaimer, the term of this patent is extended or adjusted under 35 U.S.C. 154(b) by 9 days.

This patent is subject to a terminal disclaimer.

(21) Appl. No.: 17/015,506

(22) Filed: Sep. 9, 2020

(65) Prior Publication Data

US 2021/0070958 A1 Mar. 11, 2021

Related U.S. Application Data

(60) Provisional application No. 62/897,762, filed on Sep. 9, 2019.

(51) Int. Cl.
*C08J 11/16* (2006.01)
*B01J 21/16* (2006.01)

(52) U.S. Cl.
CPC .............. *C08J 11/16* (2013.01); *B01J 21/16* (2013.01); *C08J 2323/06* (2013.01); *C08J 2323/12* (2013.01)

(58) Field of Classification Search
USPC .......... 521/47; 502/150; 528/481, 483, 486, 528/491, 494, 495; 526/64, 114, 130
See application file for complete search history.

(56) References Cited

U.S. PATENT DOCUMENTS

| 5,380,690 A | * | 1/1995 | Zhicheng | B01J 29/40 502/65 |
| 2016/0160127 A1 | | 6/2016 | Franco et al. | |
| 2018/0361356 A1 | | 12/2018 | Streiff et al. | |

FOREIGN PATENT DOCUMENTS

| CN | 106220978 A | | 12/2016 |
| JP | 07024322 | * | 1/1995 |
| JP | 2000219884 A | | 8/2000 |
| WO | 2015012676 A1 | | 1/2015 |
| WO | 2017103012 A1 | | 6/2017 |

OTHER PUBLICATIONS

JP07024322 machine translation: Sumita, Hirosuke et al. Production of Cracking Catalyst (Year: 1995).*
The International Search Report and The Written Opinion for PCT/EP2020/075167 dated Oct. 16, 2020.

* cited by examiner

*Primary Examiner* — Terressa Boykin

(57) ABSTRACT

A method of depolymerizing plastics using a halloysite catalyst is described herein. The method reduces the energy required for the depolymerization process while achieving improved depolymerization results.

20 Claims, No Drawings

PLASTIC DEPOLYMERIZATION USING HALLOYSITE

PRIOR RELATED APPLICATIONS

This application claims the benefit of priority to U.S. Provisional Application No. 62/897,762, filed on Sep. 9, 2019, which is incorporated here by reference in its entirety.

FEDERALLY SPONSORED RESEARCH STATEMENT

Not applicable.

FIELD OF THE DISCLOSURE

This disclosure relates to methods for depolymerizing plastic feedstock, and more particularly to methods for depolymerizing plastic feedstock in the presence of halloysite catalyst in order to reduce onset temperature and reaction half time.

BACKGROUND OF THE DISCLOSURE

Plastics are inexpensive and durable materials, which can be used to manufacture a variety of products that find use in a wide range of applications, so that the production of plastics has increased dramatically over the last decades. Due to the durability of the polymers involved in plastic production, an increasing amount of plastics are filling up landfill sites and occupying natural habitats worldwide, resulting in environmental problems. Even degradable and biodegradable plastics may persist for decades depending on local environmental factors, like levels of ultraviolet light exposure, temperature, presence of suitable microorganisms and other factors.

Currently plastic recycling primarily includes mechanical recycling and chemical recycling. Globally speaking, mechanical recycling is the most used method for new uses of plastics, and through this method, plastics are mechanically transformed without changing their chemical structure, so they can be used to produce new materials. Typical mechanical recycling steps include collecting plastic wastes; sorting plastic wastes into different types of plastics and colors; packaging plastics by pressing or milling plastics; washing and drying the plastics; reprocessing the plastics into pellets by agglutinating, extruding and cooling the plastics; and finally recycled raw materials are obtained. This is the most widely used technology for the polyolefins polyethylene (PE) and polypropylene (PP).

Chemical recycling, on the other hand, reprocesses plastics and modify their structure so that they can be used as raw material for different industries or as a basic input or feed stock for manufacturing new plastic products. Chemical recycling typically includes the steps of collecting plastics, followed by heating the plastics to break down the polymers (thus depolymerization). The resulting monomers may then be used to re-manufacture plastic or to make other synthetic chemicals.

In practice, different types of plastic wastes are collected together, so that plastic bales contain a mixture of different plastics, the composition of which may vary from source to source, and the proportions of which may vary from bale to bale. This is particularly troublesome for chemical recycling because the mixture of different plastics makes it difficult to control the heating process, resulting in high cost of energy required during heating.

Halloysite is a clay mineral with a hollow nanotubular structure, generally having the empirical formula of $Al_2Si_2O_5(OH)_4$. The halloysite nanotubes (HNTs) can be used for controlled delivery and release of drugs as well as nanocomposite and rheology modification applications.

Two-layer halloysite tubes have average dimensions of 15×1000 nm comparable to carbon nanotubes. The surface chemistry of halloysite nanotubes is versatile for the targeted chemical modification of the inner lumen and outer surface.

SUMMARY OF THE DISCLOSURE

The present disclosure is a new use of halloysite nanotubes as a catalyst in the depolymerization process of polyolefin. The use of halloysite reduces onset temperature and reaction half time, while also altering the some of the physical and chemical properties of the resulting products, including shifting the distillation range toward lighter boiling products and changing the amount and type of olefinic, paraffinic and aromatic hydrocarbons.

A method for depolymerizing a plastic feedstock is therefore disclosed herein. The method comprising the steps of introducing a feedstock comprising plastic, mixing the feedstock comprising plastic with a catalyst to obtain a reactant mixture, and heating the reactant mixture to obtain a product, wherein the catalyst is halloysite.

In one embodiment, the reactant mixture comprises 1-20 wt % of the catalyst. Alternative, the reactant mixture comprises 1-10 wt % of the catalyst In one embodiment, the feedstock comprising plastic is a polyolefin or a mixture of polyolefins. Alternatively, the feedstock comprising plastic may comprise high density polyethylene (HDPE), polypropylene (PP), and mixtures thereof. Alternatively, the feedstock may comprise low-density polyethylene (LDPE), linear low density polyethylene (LLDPE), polybutene, ethylene-propylene copolymers. Alternatively, the feedstock may comprise polymeric mixtures that incorporates other materials like polystyrene (PS), ethyl-vinyl acetate copolymer (EVA), ethyl-vinyl alcohol copolymer (EVOH), polyvinyl chloride (PVC), or mixtures thereof.

In one embodiment, the onset temperature in the heating step is reduced by 5% as compared to a depolymerization without using the catalyst.

In one embodiment, in the heating step the pressure in the reactor is maintained at 0-200 psi. Alternatively, in the heating step the pressure in the reactor is maintained at 5-100 psi. Alternatively, in the heating step the pressure in the reactor is maintained at 10-30 psi.

In one embodiment, a depolymerization half time at 400° C. is 50 minutes or less. Alternatively, a depolymerization half time at 400° C. is 40 minutes or less.

In one embodiment, the product of the heating step comprises a liquid product.

In one embodiment, a final boiling point (FBP) of 99.5 wt % is determined by ASTM D7213 simulated distillation GC method, and the FBP of the of the liquid product is at least 5° C. lower than a FBP of a liquid product from the method of claim 1 without using the catalyst. Alternatively, the FBP of the of the liquid product is at least 10° C. lower than a FBP of a liquid product from the method of claim 1 without using the catalyst.

In one embodiment, a weight average molecular weight (Mw) of the liquid product is at least 5% lighter than a Mw of a liquid product from the method of claim 1 without using the catalyst. Alternatively, The weight average molecular weight (Mw) of the liquid product is at least 10% lighter than a Mw of a liquid product from the method of claim 1 without using the catalyst.

As used herein, "halloysite" means an aluminosilicate clay mineral with the empirical formula $Al_2Si_2O_5(OH)_4$, and typically comprises aluminum (20.90%), silicon (21.76%) and hydrogen (1.56%). Halloysite naturally occurs as small cylinders (nanotubes) that have a wall thickness of 10-15 atomic alumosilicate sheets, an outer diameter of 50-60 nm, an inner diameter of 12-15 nm, and a length of 0.5-10 The halloysite used in this disclosure is not limited to a specific composition or method of production, as a person skilled in the art can easily adjust the composition or method of production.

As used herein, "alpha-olefin" refers to organic compounds which are alkenes (also known as olefins) with a chemical formula $C_xH_{2x}$, distinguished by having a double bond at the primary or alpha (a) position.

As used herein, "paraffin" refers to an acyclic saturated hydrocarbon, i.e. an alkane consists of hydrogen and carbon atoms arranged in a tree structure in which all the carbon-carbon bonds are single.

As used herein, "C6-C8 aromatics" refer to a hydrocarbon with sigma bonds and delocalized pi electrons between carbon atoms forming a circle, wherein total of 6 to 8 carbon atoms are present.

As used herein, "onset temperature" or $T_{onset}$ refers to the temperature when first drop of liquid product is observed in the heating process.

As used herein, "depolymerization half time" or "half time" is defined as the time required to achieve a 50% loss of the sample mass of the plastic at a certain temperature.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| GPC | Gel permeation chromatography |
| HDPE | High density polyethylene |
| HNT | Halloysite nanotube |
| MW | Molecular weight |
| MN | Number weight |
| PE | Polyethylene |
| PP | Polypropylene |
| PS | Polystyrene |
| TGA | Thermogravimetric analysis |

DESCRIPTION OF EMBODIMENTS OF THE INVENTION

The disclosure provides a novel method for depolymerizing a plastic feedstock in the presence of a halloysite catalyst, so as to facilitate the kinetics of depolymerization. Specifically, by using the halloysite catalyst in the depolymerizing process, the onset temperature can be reduced. Applicant further discovered that the reaction half time can also be reduced. The resulting products from the depolymerization by using the halloysite catalyst have a lower average molecular weight. These improved results would lead to an improved plastic recycling process while generating a liquid product that has lower boiling point that could be advantageous.

The halloysite catalysts used in the embodiments were commercially available, for example from SigmaAldrich. However, other halloysite based materials are also possible, as long as similar catalytic activity is retained.

The plastic feedstock used in this disclosure includes high-density polyethylene (HDPE), polypropylene (PP), and mixtures thereof. However, other plastic feedstock may also be depolymerized, including but not limited to other polyolefins like low-density polyethylene (LDPE), linear low density polyethylene (LLDPE), polybutene, ethylene-propylene copolymers. The feedstock can also include polymeric mixtures that incorporates other materials like polystyrene (PS), ethyl-vinyl acetate copolymer (EVA), ethyl-vinyl alcohol copolymer (EVOH), polyvinyl chloride (PVC), or mixtures thereof.

In one embodiment, the plastic feedstock is first melt-compounded with the halloysite catalyst in an extruder or any convenient melt feeding unit.

In an alternative embodiment the catalyst can also be delivered separately into the reaction zone or fed into the reactor as a mechanical mixture with solid polymer feed.

The amount of halloysite catalyst in the plastic/catalyst reactant mixture can vary, depending on the type of feedstock and the energy consumption plan. In one embodiment, the amount of halloysite catalyst used is 1 wt % to 20 wt % of the total reactant mixture. In an alternative embodiment, the amount of halloysite catalyst used is 2 wt % to 18 wt %, or 5 wt % to 15 wt %.

Thermogravimetric analysis (TGA)

TGA is a convenient technique to study thermal and thermo-catalytic delopymerization processes. The plastic feedstock and the reactant mixture is tested in thermogravimetric analysis (TGA) to determine sample depolymerization rate. In a typical configuration, the starting temperature is 25-100° C. and the heating rate is 10° C./min, but other configuration can also be adopted. Polymer samples were heated under $N_2$ at 10K/min to the desired depolymerization temperature in a Mettler Toledo TGA/DSC 3+ and held for 1 hour. However, the choice of inert gas, the amount of inert gas, and the heating temperature and length of the depolymerization may change depending on the plastic feedstock and amount of the halloysite catalyst used.

The depolymerization half time at a specific temperature, defined as the time required to achieve a 50% loss of sample mass, was recorded directly if the value is less than 60 min or determined under the assumption of a first order decomposition kinetics as $t_{1/2}=0.693/k$, where k is the first order rate constant determined graphically using a $Ln(C_0/C)$ vs time plot.

General Depolymerization

General depolymerization is carried out in a reactor to determine the heat requirements of the process, the depolymerization onset temperature and to collect gas, liquid and solid products to determine composition and properties.

In one set of experiments, a 20 g polymer sample along with catalyst in a closed 125 ml Parr reactor at 11 psi pressure and constant $N_2$ flow of 100 sccm (standard cubic centimeter per minute) was placed in the hot zone of a furnace preheated to 650° C. The evolving vapors leaving the reactor were condensed in an ice trap. The following process parameters were recorded and used to characterize the depolymerization efficiency:

$T_{onset}$: temperature of reaction mixture when condensation of liquid product is first observed.

L %: yield of liquid condensable in an ice trap.

S %: yield of solid residue in the reactor, excluding catalyst.

In a different set of experiments, 30 g of polymer feed is loaded in a 500 ml round glass reactor having three necks equipped with thermocouple and nitrogen inlet. The solid catalyst is then introduced into the glass reactor. The reactor is placed in electrically heating heated system (mantle bath), and setting the desired power, the temperature was raised up to 550° C. while product collected in two traps.

In a larger scale experiment, 500 g of polymer feed along with the solid catalyst is loaded in a 1.8 L reactor with an agitator and heated by a furnace. A $N_2$ purge is established through the reactor and downstream equipment, where the downstream equipment comprised a heated overhead line and two product-collection vessels at ambient temperature. Composition of the gas component was determined by an online GC. The furnace is set at 500° C. and reactor heating is initiated. Once the furnace temperature reaches 200° C., the $N_2$ purge is reduced to 50 sccm. Once the internal temperature reaches 200° C., the agitator is started at 60 rpm. The internal temperature is monitored until an inflection point in the time dependent temperature curve is noted, signifying the onset of depolymerization. Once this inflection point is noted, the reaction was allowed to continue for three more hours. The reactor is then cooled, where the liquid product is collected and weighed.

After the depolymerization step, the resulting liquid product is characterized using gas chromatography, simulated distillation, $^1$H NMR and gel permeation chromatography (GPC), to determine the types of chemicals, the amount of each, and the molecular weight/molecular weight distribution thereof Gas Chromatography Liquid product samples collected at the depolymerization step were characterized by gas chromatography using an Agilent 7890 equipped with a non-polar column and FID with one of the following distributions.

Method 1
C2-C4s (wt %)
C5s (wt %)
C6s (wt %)
C7s (wt %)
C8s (wt %)
C9 and heavier (wt %)
Linear α-olefines (wt %)
n-paraffins (wt %)
Method 2
S-RT (<nC7), wt % —Components eluting before n-heptane.
M-RT (nC7-nC11), wt % —Components eluting between n-heptane and n-undecane
L-RT (nC11-nC28), wt % —Components eluting between n-undecane and n-octacosane
XL-RT (>nC28), wt % —Components eluting after n-octacosane Simulated Distillation Simulated distillation (SimDist) is used to quickly and accurately determine the true boiling point distribution of crude oil and petroleum refining fractions by gas chromatography. The sample is first injected into the GC, and the analytical column separates the sample into individual components in order of their boiling points. The components are detected as they elute from the column, and a software is used to convert the data produced by the GC into a report that includes the boiling curve, initial boiling point (IBP), final boiling point (FBP), % cutoff table, etc. The simulated distillation data for the liquid samples were collected using ASTM D7213 on an Agilent 6980. SimDist data used for liquid characterization includes:

IBP, 0.5 wt % off (° C.)
10 wt % off (° C.)
30 wt % off (° C.)
50 wt % off (° C.)
70 wt % off (° C.)
90 wt % off (° C.)
95 wt % off (° C.)
99 wt % off (° C.)
FBP, 99.5 wt % off (° C.)

$^1$H NMR

NMR data were collected on a Bruker AV500 MHz NMR spectrometer at 25° C. with a 5 mm Prodigy probe. 1D $^1$H NMR data were processed using TOPSPIN software with an exponential line broadening window function. Quantitative measurements utilized a 15 second relaxation delay, 30 degree flip angle pulse, and 32 scans to facilitate accurate integrals. Spectral integrations was used for aromatic olefinic, and paraffinic protons were obtained and used to quantify relative ratios of these protons. All samples were analyzed with an addition of $CDCl_3$ (0.6 g of sample with 0.4 g of $CDCl_3$). $^1$H NMR data used for liquid characterization includes:

% Aromatic Proton
% Paraffinic Proton
% Olefinic Proton

Gel Permeation Chromatography (GPC)

Molecular Weight and Molecular Weight Distribution (MWD) was measured using f Gel Permeation Chromatography (GPC) in 1,2,4-trichlorobenzene (TCB). Molecular weight parameters (Mw, Mn) and molecular weight distributions for all the samples were measured by using a GPC-IR apparatus by PolymerChar, which was equipped with a column set of four PLgel Olexis mixed-bed (Polymer Laboratories) and an IR5 infrared detector (PolymerChar). The dimensions of the columns were 300×7.5 mm and their particle size is 13 μm. The mobile phase flow rate was kept at 1.0 mL/min. All the measurements were carried out at 150° C. Solution concentrations were 2.0 mg/mL (at 150° C.) and 0.3 g/L of 2,6-diterbuthyl-p-chresole were added to prevent degradation. Vials are also solubilized in $N_2$ atmosphere.

For GPC calculation, a universal calibration curve was obtained using 12 polystyrene (PS) standard samples supplied by PolymerChar (peak molecular weights ranging from 266 to 1220000). A third order polynomial fit was used for interpolating the experimental data and obtain the relevant calibration curve. Data acquisition and processing was done by using Empower 3 (Waters).

The Mark-Houwink relationship was used to determine the molecular weight distribution and the relevant average molecular weights: the K values were KPS=1.21×10−4 dL/g, and KPP=1.90×10-4 dL/g for PS (calibration) and PP, respectively, while the Mark-Houwink exponents α=0.706 for PS and □=0.725 for PP were used.

Below are the conditions of examples and comparative examples.

Example 1: TGA Depolymerization Rate

The depolymerization half time for a sample consisting of a 1:1 mixture of HDPE (ACP9255 grade, a LyondellBasell product) and Polypropylene (grade HP522, a LyondellBasell product) with 10% of a catalyst sample with 10% Halloysite clay (SigmaAldrich) was 23 minutes at 400° C. was almost four times faster than that observed in the comparative example 1. The results demonstrated the catalytic effect of the material on depolymerization rate.

Comparative Example 1: TGA Depolymerization Rate without CATALYST

The depolymerization half time for a sample consisting of a 1:1 mixture of HDPE (ACP9255 grade, a LyondellBasell product) and Polypropylene (grade HP522, a LyondellBasell product) was 96 minutes at 400° C. without using any catalyst.

Example 2: Depolymerization (10 Wt % Halloysite to HDPE)

20 g of a HDPE (ACP9255 grade, a LyondellBasell product) was depolymerized in the presence of 10% Halloysite nano-clay resulting in a clear yellow liquid. Process parameters and liquid properties as characterized by GC, NMR and GPC are summarized in Table 1.

Example 3: Depolymerization (10 Wt % Halloysite to PP)

20 g of Polypropylene (grade HP522, a LyondellBasell product) was depolymerized in the presence of 10% Halloysite nano-clay resulting in a clear yellow liquid. Process parameters and liquid properties as characterized by GC, NMR and GPC are summarized in Table 1.

Comparative Example 2: Depolymerization without Catalyst 20 g of HDPE (ACP9255 grade, a LyondellBasell product) was depolymerized without catalyst resulting in waxy liquid. Process parameters and liquid properties as characterized by GC, NMR and GPC are summarized in Table 1.

Comparative Example 3: Depolymerization without Catalyst 20 g of Polypropylene (grade HP522, a LyondellBasell product) was depolymerized without catalyst resulting in yellow liquid. Process parameters and liquid properties as characterized by GC, NMR and GPC are summarized in Table 1.

TABLE 1

EFFECT OF HALLOYSITE ON HDPE AND PP

| Process Parameter/Liquid Property | Ex. 2 | Ex. 3 | Comp. Ex. 2 | Comp. Ex. 3 |
|---|---|---|---|---|
| Polymer | HDPE | PP | HDPE | PP |
| Catalyst | Halloysite | Halloysite | none | none |
| $T_{onset}$ ° C. | 447 | 334 | 456 | 419 |
| L %, % | 89.4 | 91.8 | 89.3 | 90.9 |
| S %, % | <1 | <1 | <1 | <1 |
| GC Data | | | | |
| C2-C4s, % | 4.36 | 4.54 | 0.97 | 0.81 |
| C5s, % | 8.50 | 9.17 | 2.09 | 4.43 |
| C6s, % | 9.72 | 10.54 | 3.70 | 6.42 |
| C7s, % | 10.84 | 13.12 | 4.73 | 1.30 |
| C8s, % | 10.57 | 13.75 | 5.02 | 4.02 |
| C9s and heavier, % | 56.01 | 48.88 | 83.50 | 83.02 |
| Linear α-olefins, % | 7.35 | 4.31 | 31.64 | 1.64 |
| n-paraffins, % | 22.21 | 2.60 | 45.58 | 6.02 |
| C6-C8 aromatics, % | 1.55 | 1.62 | 0.82 | 0.20 |
| SimDist Data | | | | |
| IBP, 0.5 wt % off (° C.) | 26 | 26 | 29 | 27 |
| 10 wt % off (° C.) | 85 | 76 | 124 | 81 |
| 30 wt % off (° C.) | 171 | 147 | 217 | 137 |
| 50 wt % off (° C.) | 241 | 201 | 288 | 232 |
| 70 wt % off (° C.) | 303 | 256 | 346 | 297 |
| 90 wt % off (° C.) | 378 | 340 | 414 | 397 |
| 95 wt % off (° C.) | 410 | 378 | 436 | 434 |
| 99 wt % off (° C.) | 466 | 443 | 475 | 506 |
| FBP, 99.5 wt % off (° C.) | 490 | 465 | 486 | 534 |
| NMR Data | | | | |
| Aromatic 1H, % | 0.37 | 0.07 | 0.27 | 0.02 |
| Paraffinic 1H, % | 93.60 | 93.81 | 93.53 | 91.90 |
| Olefinic 1H, % | 5.79 | 6.12 | 6.20 | 8.08 |

The results shown in Table 1 illustrate the advantage of depolymerizing HDPE or PP in the presence of the halloysite catalyst. The depolymerization onset temperature was reduced for PP. A smaller reduction of onset temperature was observed for HDPE as well.

The amount of α-olefins and n-paraffins after depolymerizing HDPE in Example 2 using the halloysite catalyst is lower than the Comparative Example 2.

For both HDPE and PP, the average molecular weight of the liquid product was reduced and the distillation range was shifted toward lighter boiling components as indicated by the GC and simulated distillation data. The significant decrease in C9 and heavier components by GC and the lower cut point temperatures by simulated distillation are evidence of the shift toward lower MW and lighter boiling products using the halloysite catalyst.

To determine the catalytic effect of the amount of halloysite used, Examples 4-6 and 8 and Comparative Example 4 were performed according to the following process.

30 g of Polypropylene commercial grade Moplen HP522H were loaded in a 500 ml round glass reactor having three necks equipped with thermocouple and nitrogen inlet. The solid catalyst is then introduced into the glass reactor in the amounts noted in Examples 4, 5 and 6 below. Two glass condensers are connected in series and maintained at 110° C. and −8° C. respectively using an oil bath (Cryostat Julabo). The reactor is placed in electrically heated system (mantle bath), and setting the desired power, the temperature was raised up to 550° C. The results are shown in Table 2 below.

9

Example 4: 2.5 Wt % Halloysite

The depolymerization experiment was carried out in presence of 0.8 g (2.5%) of halloysite catalyst. The depolymerization time was 37 minutes.

Example 5: 10 Wt % Halloysite

The depolymerization experiment was carried out in presence of 3.0 g (10%) of halloysite catalyst. The depolymerization time was 37 minutes.

Example 6: 20 Wt % Halloysite

The depolymerization experiment was carried out in presence of 6.0 g (10%) of halloysite catalyst. The depolymerization time was 37 minutes.

Example 8: 2.5 Wt % Kaolin

The depolymerization experiment was carried out in the presence of 0.8 g (2.5%) kaolin catalyst. The depolymerization time was 37 minutes.

Comparative Example 4: No Catalyst

The depolymerization experiment was carried out without any halloysite catalyst. The depolymerization time was 38 minutes.

TABLE 2

EFFECT OF HALLOYSITE USED

| Process Parameter/Liquid Property | Comp. Ex. 4 | Ex. 4 | Ex. 5 | Ex. 6 | Ex. 8 |
|---|---|---|---|---|---|
| Catalyst | None | Halloysite 2.5% | Halloysite 10% | Halloysite 20% | Kaolin 2.5% |
| $T_{onset}$, °C. | 275 | 201 | 270 | 178 | 296 |
| L %, % | 79 | 73 | 80 | 80 | 70 |
| S %, % | <1 | <1 | <1 | <1 | <1 |
| GC Data | | | | | |
| S-RT(<nC7), wt % | 0.3 | 4 | 10 | 10 | 3.4 |
| M-RT (nC7-nC11), wt % | 32 | 36 | 69 | 57 | 40 |
| L-RT (nC12-nC28), wt % | 57 | 56 | 21 | 33 | 55 |
| XL-RT (>nC28), wt % | 8 | 4 | 0 | 0 | 2.4 |
| NMR Data | | | | | |
| Aromatic 1H, % | 0.03 | 0.02 | 0.03 | 0.16 | 0.00 |
| Paraffinic 1H, % | 93.5 | 96 | 95.5 | 95.2 | 94.7 |
| Olefinic 1H, % | 6.5 | 4.0 | 4.5 | 4.6 | 5.3 |
| GPC data | | | | | |
| Mw | 378 | 355 | 234 | 200 | — |
| Mn | 192 | 188 | 146 | 125 | — |

As shown in Table 2, using the halloysite catalyst can reduce the onset temperature, resulting in less energy consumed for the depolymerization. The GC and GPC data also confirm that the molecular weight of the liquid product using the halloysite catalyst is lower than that without using the catalyst, indicating that the depolymerization is more complete.

The GPC data shows the Mw and Mn for the pyrolytic oils obtained according to the table. Both Mw and Mn are indicators of the Average Molecular Weight (Weigh and Numerical), which shows a clear reduction of those molecular parameters in function of the amount of halloysite used in comparison with the non-catalyzed Comp. Ex. 4. The Mw of Examples, 4, 5, 6 are 355, 234 and 200, which represent a 6%, 38%, and 47% reduction comparing to 378 in Comparative Example 4. In other words, the reduction of Mw and Mn indicates that the efficiency of depolymerization is increased, because the breakdown is more complete. As a result, the use of halloysite catalyst indeed improves the depolymerization process.

Batch Depolymerization

In some embodiment, a large-scale batch depolymerization may be desired such that a greater amount of plastics can be processed. To test the feasibility and efficiency of batch depolymerization, experiments were conducted in a 1.8 L Hastelloy C276 reactor, equipped with an agitator and heated by a furnace.

The material to be depolymerized was added to the reactor that was sealed. A $N_2$ purge established through the reactor and downstream equipment, where the downstream equipment comprised a heated overhead line and two product-collection vessels at ambient temperature. The overhead line comprised a vertical section maintained at 175° C. and a downward sloping line, maintained at 125° C., to the product collection vessels. Pressure was controlled at 30 psig by a back pressure regulator. Composition of the gas component was determined by an online GC.

The furnace was set at 500° C. and reactor heating was initiated. Once the furnace temperature reached 200° C., the $N_2$ purge was reduced to 50 sccm. Once the internal temperature reached 200° C., the agitator was started at 60 rpm. The internal temperature was monitored until an inflection point in the time dependent temperature curve was noted, signifying the onset of depolymerization. Once this inflection point was noted, the reaction was allowed to continue for three more hours. The reactor was then cooled. The liquid product was collected and weighed. The reactor was opened and any solids were removed and weighed. Gas yields were calculated by difference.

Example 7—300G Scale Experiment with Halloysite

The reactor was loaded with 300 g of Moplen HP522H and 15.0 g of Halloysite. The polymer was depolymerized by the procedure above. Depolymerization onset was noted at an internal reactor temperature of 352° C. Liquid yield was 265.5 g. 15.2 g of black, granular solid was recovered from the reactor. A small amount of residue was wiped from the reactor walls and internals, and was estimated to be less than 1 g. A gas yield of 33.5 g was calculated.

Comparative Example 5—Moplen HP5222H without Catalyst

The reactor was loaded with 300 g of Moplen HP522H and the polymer depolymerized by the procedure above. Depolymerization onset was noted at an internal reactor temperature of 419° C. Liquid yield was 271.5 g. A small amount of black residue was wiped from the reactor walls and internals, and was estimated to be less than 1 g. A gas yield of 27.5 g was calculated.

The results from Example 7 and Comparative Example 5 are shown below in Tables 3-6.

TABLE 3

PROCESS VARIABLES, ONSET TEMPERATURE AND YIELDS

| | Furnace T (° C.) | Rx P (psig) | N2 Flow Rate (sccm) | Time (min) | Depoly Onset T (° C.) | Liquid Yield (%) | Gas yield (%) |
|---|---|---|---|---|---|---|---|
| Comp. Ex. 5 | 500 | 30 | 50 | 180 | 419 | 91 | 9 |
| Ex. 7 | 500 | 30 | 50 | 180 | 352 | 89 | 11 |

TABLE 4

NORMALIZED, AREA WEIGHTED AVERAGE GC DATA FOR GAS EVOVLED

| Component (norm, area weighted wt %) | Comp. Ex. 5 | Ex. 7 |
|---|---|---|
| Methane | 3.54 | 4.83 |
| Ethylene | 0.50 | 2.61 |
| Ethane | 9.84 | 7.41 |
| Propylene | 47.42 | 17.26 |
| Propane | 3.82 | 7.56 |
| Propadiene | 0.00 | 8.31 |
| Cyclopropane | 0.00 | 0 |
| Isobutane | 0.28 | 2.68 |
| Isobutylene | 9.42 | 15.49 |
| Butene-1 | 0.00 | 3.22 |
| 1,4 Butadiene | 0.04 | 0.33 |
| Butane + trans-2-butene | 0.39 | 6.6 |
| cis-2-Butene | 0.07 | 3.36 |
| Acetone (TST, ESTD) | 0.01 | 0.01 |
| Isopentane | 0.07 | 0.86 |
| Pentene-1 | 0.82 | 4.36 |
| trans-2-pentene | 1.03 | 2.27 |
| 2-methyl-2-butene, pentane, cis-2-pentene | 22.65 | 12 |
| Hexanes | 0.10 | 0.83 |

TABLE 5

SUMMARY OF DETAILED ANALYSIS OF LIQUID SAMPLES

| Hydrocarbon Type | Comp. Ex. 5 | Ex 7 |
|---|---|---|
| C2-C4s (wt %) | 1.9 | 3.9 |
| C5s (wt %) | 5.5 | 9.4 |
| C6s (wt %) | 8.9 | 11.3 |
| C7s (wt %) | 3.0 | 11.1 |
| C8s (wt %) | 6.6 | 16.3 |
| C9 and heavier (wt %) | 74.2 | 47.9 |
| α-olefins (wt %) | 2.4 | 4.0 |
| n-paraffins (wt %) | 5.8 | 5.9 |
| C6-C8 aromatics (w/co-elution) (wt %) | 1.5 | 3.3 |
| Density (kg/m3) | 751.6 | 754.6 |

As can be seen in Table 3, the depolymerization onset temperature in Example 7 is much lower than that in Comparative Example 5, indicating that the use of halloysite catalyst can indeed benefit the depolymerization reaction, even in this larger scale configuration. While the liquid yield in Example 7 is slightly lower than Comparative Example 5, the gas yield in Example 7 is higher than Comparative Example.

Table 4 further shows the breakdown of gas components produced in the depolymerization process. As seen in Table 4, the use of the halloysite catalyst increases almost all the gaseous components as compared to Comparative Example 5, with the exception of ethane, propylene and 2-methyl-2-butene, pentane and cis-2-pentene. This further shows that the depolymerization with halloysite reaches similar or better results.

Table 5 shows that in the liquids obtained from depolymerization, Example 7 produced more lighter components (C2-C8s) than Comparative Example 5. For example, Example 7 has twice the C2-C4s than Comparative Example 5 (3.9 wt % to 1.9 wt %), 70% more C5s (9.4 wt % to 5.5 wt %), 27% more C6s (11.3 wt % to 8.9 wt %), 270% more C7s (11.1 wt % to 3.0 wt %), and 146% more C8s (16.3 wt % to 6.6 wt %). As a result, Example 7 produced 35.4% less heavier olefins, C9 and heavier, than Comparative Example 5 (47.9 wt % to 74.2 wt %). These results indicate that with the halloysite catalyst contributes to a more thorough depolymerization, thus requiring less downstream process.

Therefore, it is suggested that using the halloysite catalyst can facilitate the depolymerization by reducing the energy needed while achieving similar results.

What is claimed is:

1. A method of depolymerizing plastics, comprising the steps of:
    a) introducing a feedstock comprising plastic;
    b) mixing the feedstock comprising plastic with a catalyst to obtain a reactant mixture; and
    c) heating the reactant mixture to obtain a product; wherein the catalyst is halloysite, and wherein the reactant mixture comprises 1-20 wt. % of the catalyst.

2. The method of claim 1, wherein the feedstock comprising plastic is a polyolefin or a mixture of polyolefins.

3. The method of claim 1, wherein in step c) onset temperature is reduced by 5% as compared to a depolymerization without using the catalyst.

4. The method of claim 1, wherein in step c) the pressure in the reactor is maintained at 0-200 psi.

5. The method of claim 1, wherein in step c) the pressure in the reactor is maintained at 5-100 psi.

6. The method of claim 1, wherein in step c) the pressure in the reactor is maintained at 10-30 psi.

7. The method of claim 1, wherein a depolymerization half time at 400° C. is 50 minutes or less.

8. The method of claim 1, wherein the product in step c) comprises a liquid product.

9. The method of claim 8, wherein a final boiling point (FBP) of 99.5 wt % is determined by ASTM D7213 simulated distillation GC method, and the FBP of the of the liquid product is at least 5° C. lower than a FBP of a liquid product from the method of claim 1 without using the catalyst.

10. The method of claim 8, wherein a final boiling point (FBP) of 99.5 wt % as determined by ASTM D7213 simulated distillation GC method, and the FBP of the of the liquid product is at least 10° C. lower than a FBP of a liquid product from the method of claim 1 without using the catalyst.

11. The method of claim 8, wherein a weight average molecular weight (Mw) of the liquid product is at least 5% lighter than a Mw of a liquid product from the method of claim 1 without using the catalyst.

12. The method of claim 8, wherein a weight average molecular weight (Mw) of the liquid product is at least 10% lighter than a Mw of a liquid product from the method of claim 1 without using the catalyst.

13. A method of depolymerizing plastics, comprising the steps of:
 a) introducing a feedstock comprising plastic;
 b) mixing the feedstock comprising plastic with a catalyst to obtain a reactant mixture; and
 c) heating the reactant mixture to obtain a product;
 wherein the catalyst is halloysite, and wherein a depolymerization half time at 400° C. is 50 minutes or less.

14. The method of claim 13, wherein the reactant mixture comprises 1-20 wt % of the catalyst.

15. The method of claim 13, wherein the feedstock comprising plastic is a polyolefin or a mixture of polyolefins.

16. The method of claim 13, wherein in step c) onset temperature is reduced by 5% as compared to a depolymerization without using the catalyst.

17. The method of claim 13, wherein in step c) the pressure in the reactor is maintained at 0-200 psi.

18. The method of claim 13, wherein the product in step c) comprises a liquid product.

19. The method of claim 18, wherein a final boiling point (FBP) of 99.5 wt % is determined by ASTM D7213 simulated distillation GC method, and the FBP of the of the liquid product is at least 5° C. lower than a FBP of a liquid product from the method of claim 1 without using the catalyst.

20. The method of claim 18, wherein a weight average molecular weight (Mw) of the liquid product is at least 5% lighter than a Mw of a liquid product from the method of claim 1 without using the catalyst.

* * * * *